(12) United States Patent
Reed

(10) Patent No.: US 10,722,852 B1
(45) Date of Patent: Jul. 28, 2020

(54) METHOD OF ALTERING THE EXISTING MOLECULAR ORGANIZATION OF A LIQUID OR GAS USING SPECIFIC LINEAR MONOPOLE MAGNETIC FIELDS, DESIGNED TURBULENCE AND GAS OR LIQUID MIXING WITHIN A REGULATED FLOW STREAM TO ESTABLISH A NEW MOLECULAR COMPOSITION

(71) Applicant: William C. Reed, Sarasota, FL (US)

(72) Inventor: William C. Reed, Sarasota, FL (US)

( * ) Notice: Subject to any disclaimer, the term of this patent is extended or adjusted under 35 U.S.C. 154(b) by 0 days.

(21) Appl. No.: 16/748,501

(22) Filed: Jan. 21, 2020

(51) Int. Cl.
*B01F 3/04* (2006.01)
*C02F 7/00* (2006.01)
*B01F 5/04* (2006.01)
*C01B 15/027* (2006.01)
*B01F 13/08* (2006.01)

(52) U.S. Cl.
CPC ...... *B01F 3/04985* (2013.01); *B01F 3/04106* (2013.01); *B01F 5/0413* (2013.01); *B01F 13/08* (2013.01); *C01B 15/0275* (2013.01); *C02F 7/00* (2013.01); *B01F 2003/04879* (2013.01); *B01F 2003/04886* (2013.01)

(58) Field of Classification Search
CPC .... B01F 3/04; B01F 3/04099; B01F 3/04106; B01F 13/10; C02F 7/00
See application file for complete search history.

(56) References Cited

U.S. PATENT DOCUMENTS 5,573,817 A    11/1996  Reed

FOREIGN PATENT DOCUMENTS

CN        204111427 U  *  1/2015  ............... C02F 7/00

* cited by examiner

*Primary Examiner* — Robert A Hopkins
(74) *Attorney, Agent, or Firm* — Dorothy S. Morse

(57) ABSTRACT

A method of using magnetic influence on flow streams of liquids and gases to over excite their atoms, break existing molecular bonds, and from two oppositely charged flow streams cause immediate and permanent bonding of oppositely charged ions to create a new molecular composition. While magnetic influence is predominately responsible for the molecular reorganization produced, induced turbulence disrupts a tendency for laminar flow in the flow streams, creating more chaotic movement and molecule collisions in liquids/gases used and a more complete result. Mixing of the two oppositely charged flow streams is preferred via a venturi. Magnetic influence on flow streams can be applied more than once. Using this method with water having a molecular composition of $H_2O$ in a primary flow stream and ozone gas in a secondary flow stream, and mixing of the oppositely charged flow streams using a venturi, a new molecular composition of $H_2O_5$ can be created.

17 Claims, No Drawings

METHOD OF ALTERING THE EXISTING MOLECULAR ORGANIZATION OF A LIQUID OR GAS USING SPECIFIC LINEAR MONOPOLE MAGNETIC FIELDS, DESIGNED TURBULENCE AND GAS OR LIQUID MIXING WITHIN A REGULATED FLOW STREAM TO ESTABLISH A NEW MOLECULAR COMPOSITION

CROSS-REFERENCES TO RELATED APPLICATIONS

None

BACKGROUND OF THE INVENTION

Field of the Invention

The field of the invention disclosed herein relates to the introduction of linear monopole magnetic fields to liquids and/or gases that are initially moving in two separate regulated flow streams, and after different magnetic influence is applied to the two flow streams, during which existing molecular bonds in those fluids are broken to free over excited atoms highly receptive to establishing new bonds, regulated mixing of over excited atoms from each flow stream allows new molecular bonding to occur and establish a new molecular composition. While water as the primary medium and ozone or oxygen as the secondary medium are discussed in the examples provided herein below, the existing molecular organization of other fluids can be altered as well using the same or similar combinations of magnetic influence, designed turbulence, and mixing of oppositely charged fluids, and application of the present invention method to other fluids is also contemplated and considered to be within its scope. Although the magnetic influence applied to the liquids and/or gases is the predominant force of change for their alteration, the extension and/or separation of molecular bonds cannot be accomplished in a complete manner without the addition of turbulence in the primary and secondary flow streams upstream from the introduction of magnetic influence, the designed and calibrated turbulence causing fluid molecules to collide with one another in a more disturbed manner. When fluids are in such a disturbed state, they become more receptive to the linear magnetic influence and desired molecular alteration. The new process disclosed herein also requires fluid in the secondary flow stream, which has an opposite magnetic charge from the fluid in the primary flow steam, to be introduced at key points into the primary flow stream for mixing purposes and the desired/altered molecular bonding that establishes a new molecular composition.

Description of the Related Art

The applicant herein is the sole inventor named in a prior U.S. Pat. No. 5,573,817 (1996) entitled "Delivering a Substance into a Material Mass". This patent teaches both a device and methods for its use, and the device as having a U-shaped pipe with magnets thereon for subjecting a fluid composition passing through the pipe to a magnetic field for polarizing the fluid composition. Polarization is achieved to an extent that it affects the organization of molecules in the fluid composition, increasing its effectiveness for penetrating a material mass to reinforce it, wherein the polarized fluid composition penetrates a material mass through its surface and moves directly and substantially into the mass. In contrast, the known prior art at the time only involved minimal and/or gradual permeation of a fluid into a material mass, or its topical application onto one or more exterior surfaces of a material mass.

Continued research and development by the applicant/inventor herein related to magnetic influence on liquid and gas molecules, the same field to which his U.S. Pat. No. 5,573,817 is related, now provides background information and understanding for the new invention disclosures presented herein below. The present invention herein includes a highly evolved and improved method for creating molecular reorganization in fluids that allows the establishment of a new and altered molecular composition after oppositely charged ions created in different flow streams of a liquid and/or gas are mixed once each flow stream has been magnetically influenced to create over excited atoms ready to establish new/altered bonding, instead of simply creating a polarization of molecules for their expedited delivery into a material mass. The present invention also creates a mechanism and/or environment to achieve the extensive and prolonged bonding of oppositely charged ions in fluids, such as liquids to liquids and/or to gases, the strength of which is the result of electrostatic forces as well as covalent forces. The prior art does not disclose or articulate the presence of both molecular forces as does the device and process of the present invention described herein below, and although similar in some respects to the disclosure of the applicant/inventor herein in his U.S. Pat. No. 5,573,817, the subject matter and parameters of the newly applied methodology described herein are different and have been proven through independent testing to have substantial differences in scope, overall performance, and usefulness when compared to the resulting polarization of molecules in a fluid caused by the device and method disclosed in U.S. Pat. No. 5,573,817.

SUMMARY OF THE INVENTION

What is first described below in this invention disclosure are examples of the present invention method utilizing water, oxygen, and/or ozone (although other liquids and gases may also be used) to illustrate the changed/reorganized molecular bonding of liquids and/or gases that can occur while utilizing specific linear monopole magnetic fields to influence regulated flow streams, and which results in a molecularly bonded reactive interface of over excited atoms free to establish new bonds and thereafter leads to extensive creation of a new and altered molecular composition with prolonged bonding. It is this method of molecularly altering the molecular organization initially occurring in a gas and/or liquid that prepares and sets the stage for a medium (liquid and/or gas) within a regulated flow stream to accept electrostatic bonding in addition to the usual covalent bonding of oppositely charged ions that would be expected. Water, as we typically know it, is formed of molecules composed of hydrogen and oxygen atoms that are oppositely charged, with each oxygen atom being covalently bonded to two hydrogen atoms to form one molecule of water. Water differs from most liquids as it is less dense when it freezes and is heated. Water is known as a universal solvent because many substances are soluble in it. Water is the only common substance to exist as a solid, liquid, and gas in normal atmospheric conditions. Water is also neutral, acidic, and alkaline at the same time.

The aforementioned characteristics of water exist because the oxygen atom has a higher electronegative charge on the side opposite the hydrogen atoms (which are covalently bonded to the oxygen atom at 110-degree angles to one another). Thus, water is a polar molecule with an electric dipole moment, its oxygen atom carrying a slight negative charge while its two hydrogen atoms each carry a slightly positive charge. The hydrogen atoms thus exhibit the acidic side of a water molecule while the oxygen atom exhibits the alkaline side, becoming a highly reactive non-metal oxidizing agent. Oxygen can also exist in molecular form as a gas, with allotropes that include two oxygen atoms bonded together and three oxygen atoms bonded together (referred to as ozone). Ozone is diamagnetic, in contrast to an oxygen molecule with two bonded hydrogen atoms that is paramagnetic. Ozone is also one of the most powerful oxidizing agents known. All of these features and dynamics of oxygen and water molecules play an important role in the discovery described and claimed herein of altering the molecular organization of existing water molecules into a new/altered molecular composition through the present invention magnetic influencing process disclosed herein below. However, it is the creation of turbulence prior to the alteration of molecular organization that maximizes the potential for linear magnetic re-organization of molecular array in the liquid or gas situated within a regulated flow stream. The source of turbulence in the present invention method is typically a singular device/obstruction positioned within the flow stream to create a vortex and complete turbulence of water when it is within the flow stream. The most preferred device for causing turbulence in the present invention disclosed herein is a strip of stainless steel of specified dimensions proportioned to the size/scale of the flow stream, which is twisted into a singular vortex inducing design and altered in such a manner that the fluid passing over and around the device creates a highly turbulent fluid motion capable of creating over excited atoms free to establish new bonds. Due to its turbulent disturbance of water molecules, the present invention's turbulence developing calibrated obstruction disclosed herein causes frictional events to occur within the water itself, producing heat as the molecules contact one another. The heat produced indicates the amount of turbulence created. The amount of heat developed is predicated on the speed and/or flow rate within the flow stream itself. At slower flow rates the turbulence is diminished but still effective with less heat developed. The higher the flow rate the heat development is increased. When the water is in such a disturbed condition, it is most receptive to accept influence from an applied linear monopole magnetic field.

Thus, one of the primary objectives of this invention is to provide a method that with water and ozone gas will create a new and altered water molecule having the composition of $H_2O_5$. A further object of this invention is to provide a method that will create altered/new molecular compositions with a prolonged or infinite shelf-life. It is also an objective of this invention to provide a method that improves water for consumption by plants, aquaculture and animals. It is a further objective of this invention to provide a method that will create altered/new molecular compositions for improving aquaculture, hydroponics, aquaponics, animal husbandry, agriculture, fisheries, horticulture, agribusiness and agronomy, wherein the improving at a minimum relates increased production, enhanced growth rate, enhanced quality of product and uniform sustainability. A further object of this invention is to establish altered/new molecular compositions that simplify wastewater and potable water treatment. A further object of this invention is to improve tap water for human consumption. In addition, it is an objective of this invention to provide a method that improves pool and spa water performance. It is also an objective of this invention to provide a method that imparts better wetting properties to water for a variety of applications. It is also an objective of this invention to create better and higher rates of dissolution of substances in fluids than previously possible. It is also an objective of this invention to use different mediums such as petroleum based products to add or remove compounds or products from the material being processed such as the oxidation, removal or reduction of sulfur contaminants from petroleum based materials. The combination of advantages and benefits provided by the present invention method with respect to fluids disclosed herein is not currently known in the prior art.

BRIEF DESCRIPTION OF THE SEVERAL VIEWS OF THE DRAWINGS

No illustrations accompany this written invention disclosure.

DETAILED DESCRIPTION OF THE INVENTION

The present invention involves the transmission of liquid and/or gases of a specified pressure/flow rate and viscosity through a pipe of specified diameter with the fluid in this primary flow stream being acted upon by an alternating series of turbulence-inducing calibrated obstructions affixed inside the pipe, and spaced specific linear monopole magnets affixed to the exterior of the pipe, and then subsequently mixing the primary flow stream with a gas such as oxygen and/or ozone in a secondary flow stream that has been influenced with an opposed monopole magnetic field, with mixing of the two flow streams occurring via a venturi of proportions calibrated to match the specified pressure/flow rate and viscosity of the fluid, and specified diameter of the pipe. Water is the primary medium first used as an example in the following invention disclosure, with ozone or oxygen used as an example of the secondary medium. However, it must be remembered that other liquids and gases can be altered in molecular composition as well by the present invention system and method. Prior to altering the existing charge state of an existing molecule in a primary flow stream using the present invention method, the overall charge (or net charge) dominant in the liquid or gas must be determined. Although the specific linear monopole magnetic influence on the fluids is the predominate force of change in the resulting molecularly altered fluid composition, it should also be understood that the molecular alteration cannot be completely accomplished without full turbulence of the liquid in the primary flow stream into a highly disturbed state prior to introduction of any magnetic influence, and then subsequent introduction of secondary flow stream gases into the primary flow stream after an opposite magnetic influence has been applied to the gas molecules.

A. Linear Monopole Magnetic Influence Upon Water

The following disclosure presents the most preferred embodiments of the present invention that include an act or series of acts performed upon water molecules having an existing covalent bond in the form of $H_2O$ which results in the formation of reorganized water molecules having a new/altered molecular arrangement/composition in the form of $H_2O_5$.

At the beginning of the most preferred embodiment of the present invention process, tap water moves in a regulated primary flow stream within which calibrated obstructions have been placed, alternating in series with linear monopole magnets of specified strengths placed externally to the pipe containing the flow stream. The first calibrated obstruction encountered by the primary flow stream causes the water to transition from laminar to turbulent flow prior to exposure of the now turbulent fluid to the first magnetic flux field, and the additional calibrated obstructions present in the flow stream to counteract the water's tendency to revert to laminar flow will restore the flow stream to full turbulence prior to its exposure to each additional magnetic flux field present. When the primary flow stream has been influenced by a positive linear monopole magnetic flux field, a secondary flow stream is influenced by a negative linear monopole magnetic flux field and then introduced via a venturi to the primary flow stream but only after the positive (or hydrogen) side of the water molecules in their chaotic states are sufficiently influenced and over excited within the positive monopole magnetic flow stream to cause extension and/or release of the original hydrogen bonds. This high level of positive flux upon the existing water molecule also causes existing bonded materials attached electrostatically to the hydrogen side of the water molecule to release any previously bonded materials. With the available positively charged hydrogen atoms in the primary flow stream now over excited and free to establish new bonding, highly charged ozone gas in the secondary flow stream (which has been already influenced by a negative linear monopole magnetic flux field) is then delivered into the primary flow stream via a venturi where the processed tap water in the primary flow stream is now also passing through with its positively charged and over excited hydrogen ions free to establish new molecular bonds. The interface and mixing in the constricted space of the venturi between the two oppositely charged flow streams causes immediate and permanent bonding of negatively charged oxygen ions from the ozone to the positively charged hydrogen ions already in the primary flow stream. This creates a different and useful molecular composition of water (with independent laboratory testing revealing characteristics different from that in $H_2O$) in which four additional oxygen atoms become electrostatically attached to the two positively charged hydrogen ions, allowing the covalently bonded oxygen ion and the four available hydrogen bonds (each as the result of electrostatic connection) are able to add an additional four oxygen atoms, creating a new/altered molecular composition of $H_2O_5$.

Turbulence

The introduction of turbulence prior to magnetic flux field influence maximizes the effect of the magnetic flux field upon the fluid in the flow stream. For purposes of the present invention, turbulence can be created by a singular calibrated obstruction device positioned within the flow stream which creates a vortex and full turbulence of the water immediately around it in the flow stream. A preferred means of creating turbulence is a strip of stainless steel twisted into a singular vortex inducing design and altered in such a manner that the fluid passing over and around the device creates highly turbulent fluid activity. As a result of the turbulent and chaotic disarray produced in the water within the flow stream, an event occurs between existing water molecules in the flow stream, creating heat as the water molecules repeatedly collide with one another. The observed increase in heat is in itself an indication of full turbulence. When the water/fluid is in the desired/disturbed condition, it is at its most receptive state to the applied linear magnetic flux field and the result is molecular reorganization. This calibrated obstruction device fits within the piping of the regulated flow stream, and the turbulence caused by its design creates disturbed and constant chaotic movement within the flow stream itself that adds pressure and heat to the flow stream. The pressure/heat/chaos created prepares the fluid in the flow stream to accept fast and long-lasting bonding with oppositely charged ions in the secondary flow stream when it becomes released via a venturi into the primary flow stream and ions in both flow streams that are available and receptive for bonding become mixed. Although not limited thereto, one example of a preferred present invention turbulence developing obstruction/device can be constructed of 316 stainless steel ⅛" flat plate. The plate is cut to a specific length and width that allows insertion into the pipe assembly used to regulate a flow stream. The plate's ends are then cut to form tabs that allow the bending of the outer edges of the lengthwise configuration. At least one hole is then drilled into each bending tab created and used for positioning and anchoring the obstruction device to the flow stream pipe. The entire plate is then bent into a circular vortex formation. The tabs are then bent opposite of one another.

Linear Monopole Magnetic Implementation

While the most preferred embodiments of the present invention are reliant upon the specific design of the magnetics used, their location, and in most cases full turbulence of the flow stream having been established prior to the influence of a specific linear monopole magnetic flux field, in certain cases the chaotic movement of existing molecules within the flow stream is not necessary in order to produce the net outcome desired. However, when a complete molecular reorganization is the objective, induced turbulence and the introduction of gases from a secondary flow stream at key points in the primary flow stream takes place, as is further explained below. Less than full turbulence might be used in one or more product preparation cycles needing the present invention method, such as but not limited to when a fluid in the primary flow stream receives magnetic influence, is then drawn from the flow steam and further processed, followed by its return to the primary flow stream after such processing.

In order to achieve alteration of the molecular structure of a given fluid and/or dissolved product molecularly attached to fluid molecules, the overall or net charge dominant within the molecular structure must be understood and derived so that the specific magnetic field thereof can be altered.

Also, the specific magnets used in the present invention, due to the material of which they are made, will not over-magnetize either of the flow streams or lose effectiveness due to turbulence or high pressures/temperatures (resulting from heat generated by frictional events between colliding/disturbed molecules) as others do. More than 90% of the magnetic field is concentrated to only one pole and delivers a concentrated monopole magnetic field with a specifically designed configuration, induction and high-density flux. The single monopole method of fluid conditioning has no cancelling effect and provides the highest flux density necessary to achieve the desired molecular bonding array/composition. Such a configuration/composition concentrates the single pole's full strength into the flow stream which organizes and energizes random and clustered water molecules with a strong and focused magnetic influence.

The above requirements for magnets used in present invention fluid conditioning are significant as the role played by the magnetics is primary in creating molecular array profile reorganization. When the present invention specific linear monopole magnetics are placed parallel to the flow, its charge produces order from the chaotic molecular behavior with a dominate singularly charged ion. In addition, magnetically instilling/influencing water causes the state of its hydrogen atoms to change and lose random alignment, further distributing the hydrogen in the flow stream as charged and separated ions, with reduced size and changed form.

However, events leading to the establishment of a new/altered molecular composition usually require at least some fluid conditioning in advance of molecular reorganization for accelerated molecular reorganization and/or completeness, including the use of designed turbulence to place the fluid targeted for magnetic influence in a more receptive state before the magnetic influence is actually applied. This conditioning can accelerate the dominance of magnetic influence over the atoms of fluid in a flow stream to which a magnetic flux field is subsequently applied, causing liquid or gas in the flow stream to achieve a receptive state for rapid new/different bonding after it becomes mixed with oppositely charged ions from a second flow stream that preferably become introduced into the primary flow stream via a venturi.

The mixing of ions conditioned to freely bond from both flow streams leads to the establishment of a new/altered molecular composition. The introduction/mixing of over excited oppositely charged ions formed by magnetic influence upon either gases or liquids when oppositely charged ions in two initially separate flow streams become mixed, then causes the fusion or coalescence of new and altered molecular combinations possible (and according to the ions that are present and available for bonding) and influence from calibrated obstructions that preferably creates an over excited ionic state. Thereafter in the primary flow stream new bonding of ions and/or their assimilation occurs via covalent and potentially electrostatic bonding, while the ionic opposites now moving/transported within the same flow stream quickly attract to one another to create the new and altered molecule composition desired.

B. Linear Monopole Magnetic Influence Upon a Gas

In further explanation of an example of present invention use with water in the primary flow stream and oxygen, ozone or the combination in the secondary flow stream, after the liquid in the primary flow stream has developed a reactive interface, oxygen, ozone or the combination are magnetically charged in an opposite linear monopole magnetic field, becoming negatively charged in this example, which is their identified IPD (Imposed Polarity Design). This then allows coalescence and/or bonding of additional oxygen to the highly positively charged hydrogen ions now available in the water present in the primary flow stream, the highly positively charged hydrogen yielding to the attraction mechanism and available to establish new and altered molecular compositions.

Fluid and Gas Interface

The combination/mixing of flow streams is most effectively accomplished in the present invention method via use of a venturi, which has been proven by the applicant/inventor herein as being a means of effective dispersion and uniformity in blending for purposes of creating a new molecular composition using the present invention method herein.

The Molecular Bonding and Process Development Creating a Highly Oxygen-Enhanced Type of Water Molecule The preceding disclosure organizes the essential elements of the most preferred present invention method herein, and gives background information relating to the specific components required to create new/reorganized types of water molecules, such as that in the form of $H_2O_5$. The process herein, and further described below, shall be identified as Molecular Composition Transformation, or MCT.

The transformative process in the present invention example using water and ozone, allows the addition of four extra oxygen ions from the ozone gas in a permanent bonding arrangement with two hydrogen ions from the water composition, and appears contrary to conventional and/or known understanding of chemistry where one positively charged proton typically attracts one negatively charged electron for molecular bonding purposes. However, it is known that due to the polarity of a water molecule, and as a result of high surface tension and capillary forces in water, it can form up to four additional hydrogen bonds in a shared structural arrangement with neighboring molecules. In addition, these extra electrostatic hydrogen bonds found in water molecules are of moderate strength. It has been estimated that 90% of the hydrogen bonds are attributable to electrostatic forces while the remaining 10% of hydrogen bonds reflect a covalent character.

Therefore surplus hydrogen bonding (beyond that normally expected through covalent bonding alone) occurs when a hydrogen atom bonded to an electronegative atom forms an electrostatic connection with another electronegative atom through interacting charges. Such interacting charges may be developed by differing mean, including the administration of linear monopole magnetic fields to liquids and gases. These magnetic fields when imposed on moving water within a flow stream are particularly enhanced when the presence of full turbulence is introduced and repeated several times in series prior to introduction and mixing of oxygen/ozone gas charged in an opposite magnetic flux field. This possibility of electrostatic connection between neighboring atoms can then occur, developed as a result of the magnetic influence, which can allow four new/additional hydrogen bonds to occur (each the result of an electrostatic connection) causing an additional four oxygen atoms to bond with the two hydrogen atoms in the original water molecule having molecular composition of $H_2O$ and creating the new and altered molecular composition of $H_2O_5$.

The present invention process described herein may have additional embodiments with variations in fluid composition or other fluid conditioning according to added functionality or capability required/desired in the new/altered molecular composition, such as multiple repetitions of the fluid passing through the zone or zones of magnetic influence that allows for the improved dissolution of a higher rate of substances to be put into solution in said passing fluids without them dropping out of solution (as typically occurs). The process can also be directly applied to various materials to improve depth of penetration where such improved penetration provides a more usable and definitive result predicated on the fluid being processed. The new/altered molecular composition also can establish improved performance of previously manufactured products due to the addition or replacement of gas or fluids to the existing product formulation. The new/altered molecular composition described with water establishes improved utilization of water itself such as applications relating to swimming pool water maintenance where the amount of chemicals needed to maintain acceptable water quality is significantly reduced. The new/altered molecular composition can also be made in several forms and then combined independently by mixing or merger via a venturi. It is known that the bonding in the new/altered molecular compositions is at least prolonged and does not fall out of solution, and may be infinite, remaining stable with the newly bonded molecular composition having the increased cohesion within itself due to the combination of electrostatic and covalent bonding. The understanding and use of specific monopole magnetic charges in the existing fluids employed as a part of the present invention method herein, determines the extent and type of fluid conditioning must take place before the new/altered molecular compositions can be established. Another virtue in the multiplicity of the described processes, applications, and variables disclosed for the present invention method herein, is to use it to add or subtract specific compositions of materials from the fluid within the primary flow stream. Such an example is the removal of sulfur from used motor oil, crude oil and/or diesel fuel. The primary flow stream would contain the petroleum-based material, processing as previously described, with subsequent introduction into the primary flow stream of magnetically influenced water from the secondary flow stream. The interface of the primary and secondary flow stream affects the sulfur saturated material and allows the sulfur to become oxidized, resulting in an inert reaction product (the new/altered molecular composition) eliminating the sulfur from the mixture after the material is allowed to rest after processing. What has been discovered is that the sulfur composition initially within the fluid in the primary flow stream has 2500 ppm sulfur or "Mercapten", which becomes reduced to 1 ppm sulfur after a rest period. The fluid remaining in the primary flow stream is then changed by the significant reduction of sulfur that occurs.

While the present invention process disclosed herein might seem contrary to conventional and known understanding of covalent bonding chemistry principles in regard to water, gases and solutions, clinical testing and interpretation of empirical data developed during the research and development of the present invention process are consistent and prove it to be unquestionable, as the obvious visual characteristics of the new $H_2O_5$ molecular composition established through implementation of the present invention method have been certified through independent laboratory analysis.

While the written description of the invention herein is intended to enable one of ordinary skill to make and use its best mode, it should also be appreciated that the invention disclosure only provides examples of specific embodiments and methods, and in addition many variations, combinations, and equivalents also exist which are not specifically mentioned. The present invention should therefore not be considered as limited to the above-described embodiments, methods, and examples, but instead encompassing all embodiments and methods identified in the accompanying claims, and also within the scope and spirit of the invention.

I claim:

1. A method of altering the existing molecular organization of atoms in fluids to establish a new molecular composition, said method comprising the steps of:
   a) providing a contained primary flow stream having at least one fluid moving therein, a contained secondary flow stream having at least one fluid moving therein, a first quantity of turbulence developing calibrated obstructions sized for installation within said primary flow stream, a second quantity of turbulence developing calibrated obstructions sized for installation within said secondary flow stream, a first quantity of linear monopole magnets imparting a magnetic flux field, and a second quantity of linear monopole magnets imparting a magnetic flux field opposite to that imparted by said first quantity of linear monopole magnets,
   b) installing at least one of said first quantity of turbulence developing calibrated obstructions in said primary flow stream, wherein turbulence developed by said at least one installed calibrated obstruction causes heat producing frictional events between molecules chaotically colliding against one another in said fluid moving in said primary flow stream,
   c) associating at least one of said first quantity of linear monopole magnets with said primary flow stream downstream from said at least one turbulence developing calibrated obstruction installed in said primary flow stream, wherein said magnetic influence from said at least one associated linear monopole magnet imposed on said molecules chaotically colliding against one another in said fluid moving in said primary flow stream over excites atoms in said molecules, freeing said over excited atoms from their existing molecular bonds and making said over excited atoms available to establish new and different molecular bonds,
   d) installing at least one of said second quantity of turbulence developing calibrated obstructions in said secondary flow stream, wherein turbulence developed by said at least one installed calibrated obstruction causes heat producing frictional events between molecules chaotically colliding against one another in said fluid moving in said secondary flow stream,
   e) associating at least one of said second quantity of linear monopole magnets with said secondary flow stream downstream from said at least one turbulence developing calibrated obstruction installed in said secondary flow stream, wherein said magnetic influence from said at least one associated linear monopole magnet imposed on said molecules chaotically colliding against one another in said fluid moving in said secondary flow stream over excites atoms in said molecules, freeing said over excited atoms from their existing bonds and making said over excited atoms available to establish new and different molecular bonds, and
   f) after said over excited atoms are created in said secondary flow stream and available to establish new and different molecular bonds, introducing at least some of said fluid moving in said secondary flow stream into said primary flow stream wherein said over excited atoms in said introduced fluid bond with oppositely charged over excited atoms in said primary flow stream, said bonding of said over excited atoms to said oppositely charged over excited atoms establishing a new molecular composition.

2. The method of claim 1 wherein said at least one fluid moving in said primary flow stream is a liquid.

3. The method of claim 2 wherein said liquid is water.

4. The method of claim 1 wherein said at least one fluid moving in said secondary flow stream is a gas.

5. The method of claim 1 wherein said gas is selected from a group consisting of oxygen, ozone, a combination of oxygen and ozone, and carbon dioxide.

6. The method of claim 1 wherein said step a) further comprises the providing of a venturi, and said step f) further comprises use of said venturi for introducing at least some of said fluid moving in said secondary flow stream into said primary flow stream.

7. The method of claim 1 wherein said steps b) and c) occur in a first location in said primary flow stream and are repeated at least once in a different location in said primary flow stream.

8. The method of claim 1 wherein said steps d) and e) occur in a first location in said secondary flow stream and are repeated at least once in a different location in said secondary flow stream.

9. The method of claim 1 wherein said step a) of providing a first quantity of turbulence developing calibrated obstructions sized for installation within said primary flow stream further comprises the providing of a turbulence developing calibrated obstruction having a circular configuration, and wherein said step b) further comprises installing said turbulence developing calibrated obstructions having said circular configuration.

10. The method of claim 1 wherein said step a) of providing a first quantity of turbulence developing calibrated obstructions sized for installation within said secondary flow stream further comprises the providing of a turbulence developing calibrated obstruction having a circular configuration, and wherein said step d) further comprises installing said turbulence developing calibrated obstructions having said circular configuration.

11. The method of claim 1 wherein said fluid moving in said primary flow stream is water having a molecular composition of $H_2O$, said fluid moving in said secondary flow stream is ozone, and said new molecular composition established is $H_2O_5$.

12. The method of claim 11 wherein said new molecular composition established has uses selected from a group consisting of enhancing performance of products to which it is applied, improving pool and spa water performance, improving swimming pool water maintenance by reducing chemical adjustment needed to maintain acceptable quality standards, simplifying waste water and potable water treatment, removing unwanted byproducts present in liquids prior to their commercial, industrial and human consumption use, use of liquids to which said new molecular composition is added for specific commercial and industrial application, and broadening use of liquids to which said new molecular composition is added for broadened commercial and industrial use.

13. The method of claim 11 wherein said new molecular composition established has improved product quality sufficient to allow use as tap water for human consumption.

14. The method of claim 1 wherein said new molecular composition established has strong molecular bonds imparting a prolonged shelf life greater than one year.

15. The method of claim 1 further comprising three additional steps, a step g) removing at least some of said fluid moving in said primary flow stream, a step h) processing said removed fluid, and a step i) reintroducing said processed fluid to said primary flow stream to establish a new molecular composition.

16. The method of claim 1 wherein said at least one fluid moving in said primary flow stream in said step a) is a petroleum product, said at least one fluid moving in said secondary flow stream in said step a) is reprocessed water, and said step a) also comprises the providing of a venturi, and further wherein said step f) comprises use of said venturi for introducing at least some of said fluid moving in said secondary flow stream into said primary flow stream, and further wherein in said step f) when said new molecular composition is established said establishment thereof creates a result selected from a group consisting of elimination of at least one unwanted contaminant within said petroleum product, oxidation of at least one unwanted contaminant within said petroleum product, and reduced concentration of at least one unwanted contaminant within said petroleum product.

17. The method of claim 1 wherein said new molecular composition established has uses for improving aquaculture, hydroponics, aquaponics, animal husbandry, agriculture, fisheries, horticulture, agribusiness and agronomy, and said improving is selected from a group consisting of increased production, enhanced growth rate, enhanced quality of product and uniform sustainability.

\* \* \* \* \*